C. A. SIPE.
Apparatus for Depositing Coffins.
No. 157,550.  Patented Dec. 8, 1874.
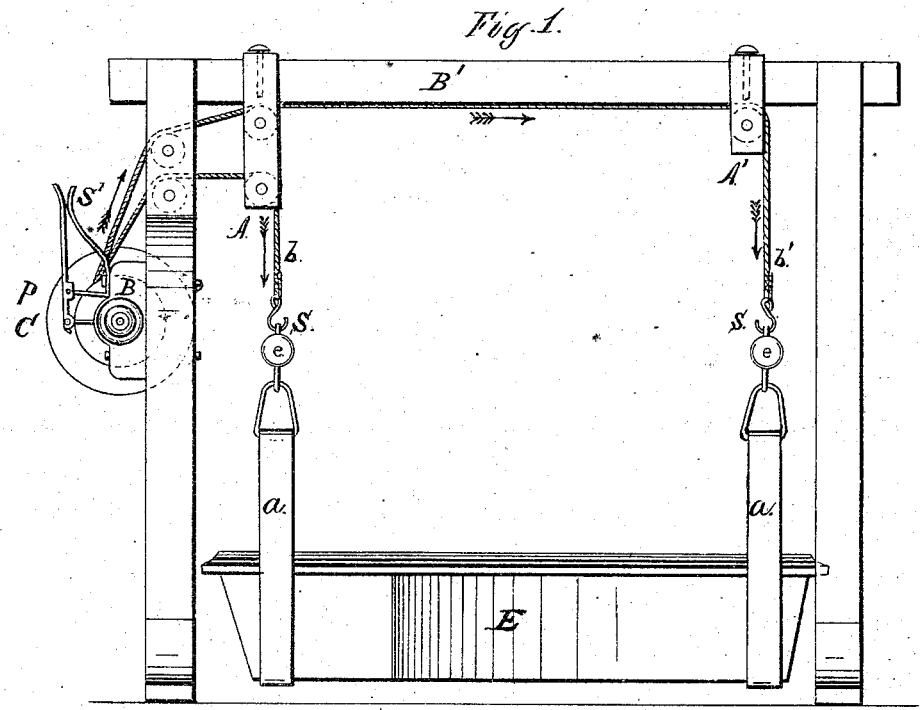
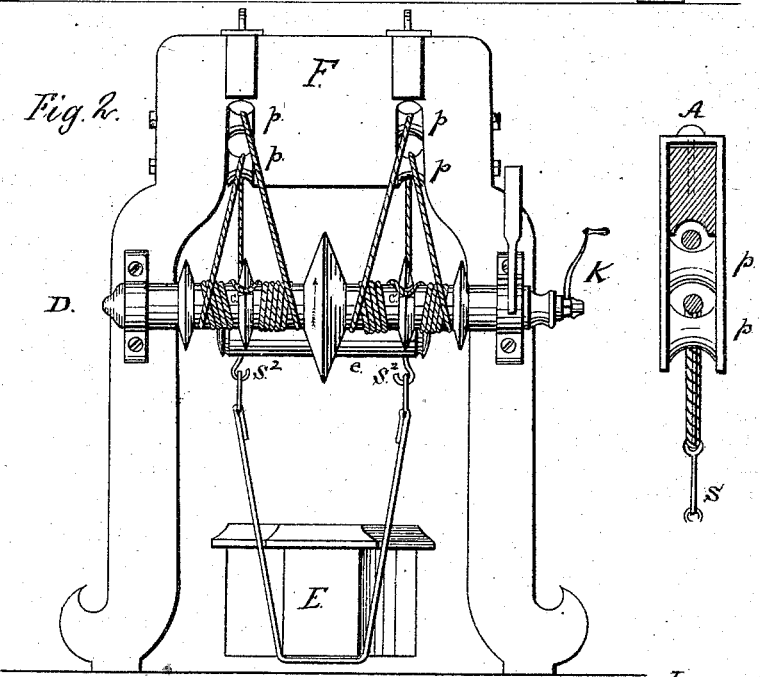
Witnesses:
S. K. Spahr.
W. B. Miller.
Inventor:
Conrad A. Sipe

UNITED STATES PATENT OFFICE.

CONRAD A. SIPE, OF WELLS' TANNERY, PENNSYLVANIA.

IMPROVEMENT IN APPARATUS FOR DEPOSITING COFFINS.

Specification forming part of Letters Patent No. 157,550, dated December 8, 1874; application filed May 6, 1874.

*To all whom it may concern:*

Be it known that I, CONRAD ALBERT SIPE, of Wells' Tannery, in the county of Fulton and State of Pennsylvania, have invented a Machine for Lowering Coffins into Graves, of which the following is a specification:

The object of my invention is to easily and securely lower a coffin into a grave, by a combination of a frame placed over it, having a drum, D, Fig. 2, attached to the frame F, Fig. 2, governed by a crank, K, Fig. 2, and check-pin C, Fig. 1, the check-pin being kept in position by the spring S', Fig. 1, and the support P on the drum-bearing B, Fig. 1, together with the cords $b\ b'$, Fig. 1, which are adjustable on the flanges $c\ c'$ on the drum D, Fig. 2, and work through the stationary pulleys $p\ p\ p\ p$ in the frame F, Fig. 2, and the adjustable pulleys A A', Fig. 1, on the bar B', Fig. 1, thereby lowering the coffin E, Fig. 1, as shown in the perspective views, Figs. 1 and 2, of the accompanying drawing.

After the frame, which may be taken apart at pleasure, is in position, the adjustable pulleys A A', Fig. 1, are placed in the position on the bar B' required by the length of the coffin to be deposited, and the cords $b\ b'$, Fig. 1, are adjusted in the flanges $c\ c'$ on the drum D, Fig. 2, so as to cause the swinging bars $e\ e$, Fig. 1, which are secured to the cords $b\ b'$ by the springs S S, Fig. 1, to ride level. The straps $a\ a$ are then passed beneath the coffin E, Fig. 1, and secured to the swinging bars $e\ e$, Fig. 1, by the springs S S, Fig. 2, when the coffin E can be lowered without accident to its resting-place by the crank K, Fig. 2.

I claim as my invention—

The combination, in a coffin-depositor, of the adjustable pulley-blocks A A', portable frame E, and lines $b\ b'$, adjustably attached to drum D, all as set forth.

CONRAD A. SIPE.

Witnesses:
SAMUEL K. SPAHR,
JOS. M. TAYLOR.